April 9, 1929.  K. FUTAMATA  1,708,218
AUTOMOBILE DIRECTIONAL SIGNAL
Filed June 25, 1928  3 Sheets-Sheet 1
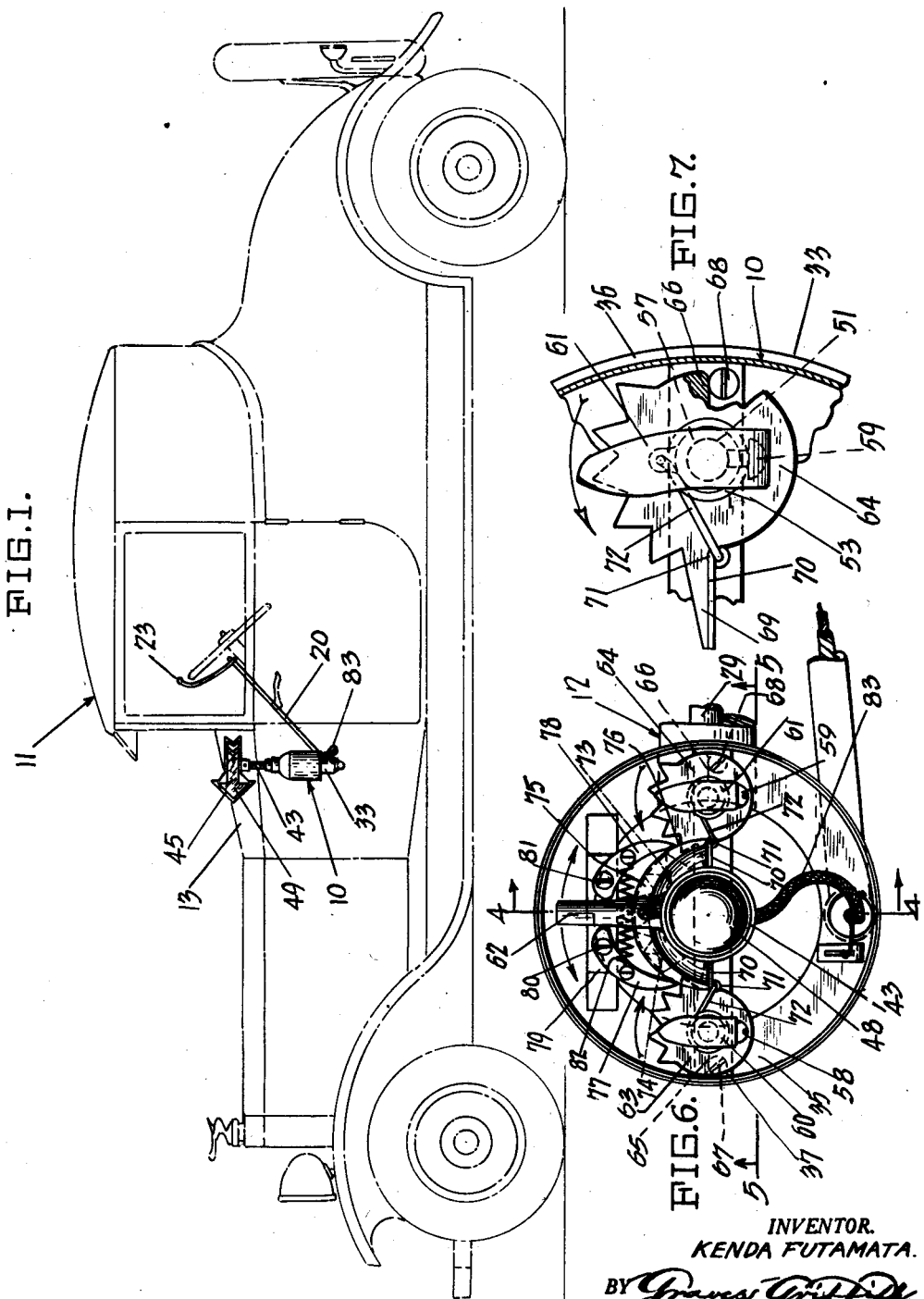
INVENTOR.
KENDA FUTAMATA.
BY
ATTORNEY

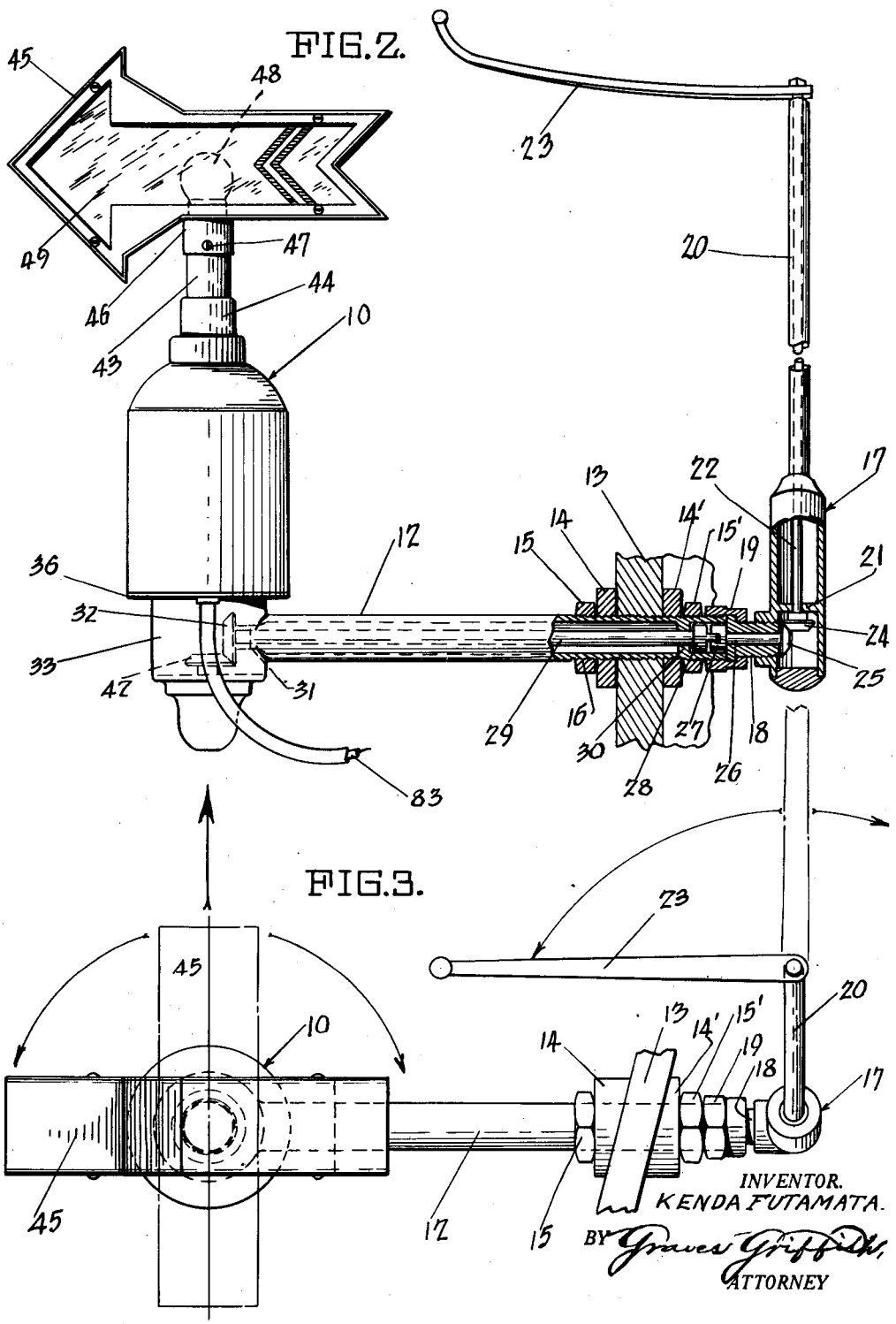

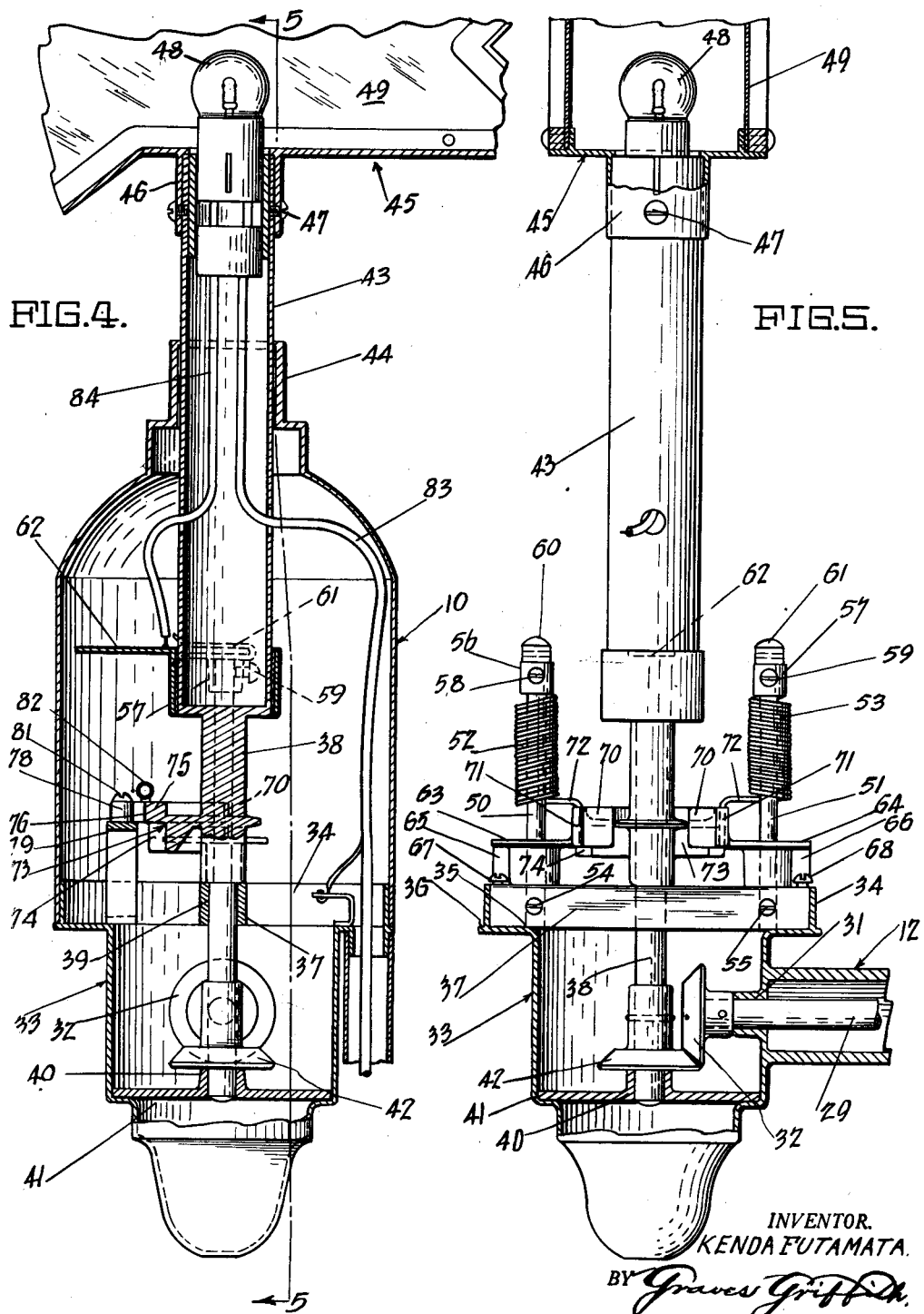

Patented Apr. 9, 1929.

1,708,218

UNITED STATES PATENT OFFICE.

KENDA FUTAMATA, OF SAN FRANCISCO, CALIFORNIA.

AUTOMOBILE DIRECTIONAL SIGNAL.

Application filed June 25, 1928. Serial No. 288,083.

The present invention relates to improvements in directional signals, and more particularly to those adaptable for use on automobiles for conveying intelligence by signals to drivers of following machines of intention to deviate from the direct line of vehicular travel as in turning at street intersections.

The primary object of the invention is the provision of a signalling device of the character designated adaptable for substitution for the hand as ordinarily employed in automobile signalling.

A further object of the invention is to provide a device of the character indicated adaptable for mounting exteriorly of the vehicle and operable from within it, for the purpose of conveying intelligence by signalling to drivers of machines following that a move to leave the line of travel, by either a right or left turn, is about to be entered upon.

An additional object of the invention is the provision of an automobile signalling device operable from within the car and adaptable for displaying signals advising as to contemplated movements, while, at the same time, relieving the driver from the necessity and inconvenience of extending an arm and hand for that purpose, as is customarily the practice.

Additional to the foregoing objects is that of providing a signal which is durable, comparatively simple in construction, and that has its actuating lever arranged in close proximity to the steering wheel of the vehicle and adapted for easy access by the driver of the vehicle without removing his hands from the steering wheel.

Other objects and advantages of the invention will be apparent with reference to the subjoined specification and accompanying three sheets of drawings, in which:

Figure 1 is a view, in dot-and-dash lines, showing the outline of a motor vehicle and, in full lines, my improved signal mounted in a convenient position near the driver's window on the left hand side of the vehicle body, the actuating means therefor extending parallel with the steering post, with the actuating lever conveniently positioned, for easy access, at the upper side of the steering wheel;

Figure 2 is an elevation of the signal showing the swingable luminous arrow, mechanism housing, horizontally disposed supporting arm, and the actuating means, the luminous arrow being shown pointing to the left for clearness of illustration;

Figure 3 is a top plan view of the signal and actuating means, as shown in Figure 2, the luminous arrow and actuating lever being shown in positions corresponding to that in Figure 2, the dot-and-dash lines indicating the neutral positions thereof, or positions paralleling the movement of the vehicle;

Figure 4 is a vertical sectional view of the signal casing and a portion of the luminous arrow, and illustrates the interior arrangement of the actuating mechanism adapted for the manual control of the arrow and the intermittent lighting of the bulb, the section being indicated by the line 4—4 in Figure 6;

Figure 5 is a vertical sectional view of the signal, taken at right angles to Figure 4, as indicated by the lines 5—5 in Figures 4 and 6, the housing being omitted in this view;

Figure 6 is a top plan view of the signal with the housing and arrow removed, showing the relative positions and arrangement of the various parts for the actuation of the signal arrow and for its illumination; and Figure 7 is an enlarged detail view of one of the mutilated gears for the return to normal, or normal position of the signal arrow.

Referring with greater particularity to the drawings and especially to Figure 1, it will be observed that the signal casing 10, as a whole, is mounted upon the driver's side of the vehicle 11 and that its supporting arm 12 extends through the cowl section 13 thereof and is of sufficient length to space the signal casing 10 some distance from the side of the vehicle so that the signal arrow 14 may be rotated freely in opposite directions from a neutral position corresponding to that of the contemplated movement of the vehicle, the supporting arm 12 extending through the vehicle side to the interior of the driver's compartment and terminating at a point adjacent the steering column. The supporting arm 12 preferably comprises a tubular member mounted in the cowl section 13 and held clamped in place by means of wedge-shaped discs 14 and 14' which are held in place by means of nuts 15 and 15' screwed upon the threaded end section 16 of the arm 12, Figures 2 and 3.

The actuating lever support 17 preferably consists of an upright fitting 17 having a nipple 18 secured in abutted relation with the end of the arm 12 by means of a coupling 19, so that the column 20 may be adjusted to vary its angle to correspond with that of the various positioned steering columns and so that the column 20 and fitting 17 may be applied after the arm 12 has been inserted through the cowl plate 13. The fitting 17 and column 20 are provided with suitable bearings 21 for the reception of a shaft 22 which shaft is connected at its upper end to an actuating-lever 23 and bears at its lower end a bevel-gear 24. The bevel-gear 24, in turn, meshes with a similar gear 25 carried by a short shaft 26 which is borne by the nipple 18, said shaft 26 having mounted upon its inner end a female coupling-member 27 adapted to mesh with a male coupling-member 28 carried by the horizontally disposed shaft 29.

The shaft 29 is carried in bearings 30 and 31 mounted in the arm 12 and is provided at its inner end with a bevel-gear 32 housed in the supporting-shell 33 of the signal casing. The shell 33 is vertically disposed and is preferably integrally formed with the arm 12 and consists of a flanged upper section 34 forming inner and outer annularly disposed shoulders 35 and 36, the inner shoulder 35 forming a bearing surface for a cross-piece 37 and the outer shoulder 36 forming a support for the dome-shaped signal-casing 10, Figures 2, 3, 4 and 5.

Centrally disposed within the supporting-shell 33 and the casing 10 is mounted a vertically disposed shaft 38 turnable in the bearing 39 formed in the cross-piece 37 and the thrust-bearing 40 mounted upon a shoulder 41 borne internally by the lower end of the supporting shell, said shaft having a bevel-gear 42 mounted at its lower end and meshing with the bevel-gear 32. A tubular signal-housing bearing member 43 is integrally formed upon the upper end of the shaft 38 and extends up through a bearing sleeve 44 borne by the upper end of the casing 10 and is provided at its upper extremity with a signal-housing 45 in the form of an arrow, said signal-housing having a ferrule 46 fitting over the upper end of the tube and attached thereto for turning movement therewith by means of screws, or the like 47.

An ordinary slip-plug lamp-bulb 48 is fitted into the upper end of the tube 43 and projects into the signal-housing 45, as shown in Figures 4 and 5, said signal-housing having its sides provided with translucent panels 49 of any suitable material and preferably of red color.

The signal-housing 45 normally points straight ahead, as shown in full lines in Figure 1 and in dot-and-dash lines in Figure 3, and is held in this neutral position by neutralizing means hereinafter described.

The signal neutralizing means consist of a pair of diametrically disposed posts 50 and 51 bearing torsion springs 52 and 53 and having their lower ends projecting into the cross-piece 37 and held rigidly therein by means of set-screws 54 and 55, said posts being arranged on opposite sides of the tube 43 and equidistant therefrom, as shown in Figure 6. The upper ends of these posts are provided with clip-bearing members 56 and 57 which are held in place by screws 58 and 59 and are provided with contact clips 60 and 61 horizontally disposed thereon and positioned in the path of a contact-blade 62 mounted upon the lower end of the tube 43.

The lower ends of the posts 50 and 51 are provided with a pair of mutilated gears 63 and 64 adapted for rotary movement inwardly only toward the tube 43, as shown by the arrows in Figure 6, said gears being provided on their under faces with stop members 65 and 66 adapted to normally engage pins or screws 67 and 68 carried by the bar 37, to prevent the turning movement of said gears in opposite directions, but allowing their inward movement as above described.

The gears 63 and 64 are exactly alike except that they are made right and left and as shown in detail in Figure 7, comprise inwardly extending extensions 69 having vertically disposed and integrally formed stop-members 70 having formed at their inner ends spring-engaging members 71 adapted to receive the lower ends 72 of the springs 52 and 53, the upper ends of said springs being secured in the members 56 and 57.

The urge of springs 52 and 53 tends to hold the gears 63 and 64 in the position shown in Figure 6, with their stop-members 65 and 66 engaged by the pins 67 and 68, or in neutral position.

The shaft 38 is provided with an integrally formed segment 73 having gear teeth 74 adapted to mesh with either of the gears 63 and 64 when rotated in opposite directions by means of the actuating lever 23 and its co-related elements.

A crescent-shaped brake-member 75 is integrally formed with the segment 73, Figures 4 and 6, and is concentrically arranged relative to the shaft 38 and provides an arcuate brake-surface 76 against which a pair of opposed spring pressed brake pawls 77 and 78 bear, said pawls being pivoted to a clip 79 by means of screws 80 and 81 and having an equalizing spring 82 connecting them together so that their ends will exert equal pressure against the brake surface 76 at all times.

The ends of the crescent-shaped brake-member 75 normally bear against the stop-members 70 of the gears 63 and 64, as shown in Figure 6 which tends to hold the arrow 45 in neutral position, or in a position paralleling the travel of the vehicle, as in Figure 1, the brake pawls 77 and 78 merely acting to brake the sudden return of the arrow to neutral position from either right or left indicating positions.

The lamp 48 is properly connected into the vehicle battery circuit (not shown) by the line 83 and ground line 84, which line 84 is connected to the blade 62, so that when the shaft 38 and tube 43, carrying the arrow 45 are rotated to either extreme right or left positions, contact will be made between the blade 62 and either of the clips 60 and 61, thereby closing the circuit and lighting the bulb 48 to indicate the intended turning movement of the vehicle.

For instance if the driver wishes to turn to the left he moves the lever 23 to the left which causes rotation of the various parts, and the consequent pointing of the illuminated arrow at right angles to its normal neutral position, this movement causing the actuation of gear 63, through its engagement with the segment 73, to turn a quarter of a revolution against the urge of its spring, so that when the signal has been given and the lever 23 released the spring 52 will immediately return the various parts to their neutral positions, the brake pawls tending to prevent undue shock in this operation.

The right hand turning movement is indicated by the arrow 45 in exactly the same manner, except that the lever 23 is moved to the right and the gear 64 functions to return the parts and the gear 63 remains stationary.

Having thus described my invention, I claim, and desire to secure by Letters Patent:

1. A signal of the class described comprising a supporting member adapted for rigid clamping to a portion of a motor vehicle, a luminous indicator turnably mounted thereon, neutralizing means coacting with said indicator to maintain the same in a predetermined neutral position, manually operated means for imparting right and left indicating movements to said indicator against the urge of said neutralizing means, brake means coacting with said neutralizing means, and means for illuminating said indicator when moved to either of said indicating positions.

2. A signal of the class described comprising a casing having a supporting arm adapted for rigid attachment to a vehicle body, an indicator-supporting member turnably mounted in said casing, an indicator mounted upon said member, spring means coacting with said indicator-supporting member and adapted to normally retain said indicator in a predetermined neutral position, brake means coacting with said spring means to prevent the sudden return to neutral position of said indicator and manually operated means operatively connected to said indicator-supporting member to cause the to-and-fro movement of said indicator to indicate either right or left turning movements of the vehicle.

3. A signal of the class described comprising a casing having a supporting arm adapted for rigid attachment to a vehicle body adjacent the wind-shield, a vertically disposed indicator-supporting member turnably mounted in said casing, a luminous indicator mounted upon the end of said supporting member and adapted to indicate right and left turning movements of the vehicle, gear means associated with said indicator-supporting member, springs connecting said gears and tending to urge said indicator to a predetermined neutral position, brake means coacting with said gear means and acting in oppposition to the spring urge to prevent the too sudden return to neutral position of the said indicator and actuating means associated with said supporting member to cause the actuation of said gears against the urge of said springs and the functioning of said indicator to indicate the determined turning movement of the vehicle.

4. A signal of the class described comprising a casing having means for its rigid attachment to a vehicle body, a vertically disposed indicator-supporting member journalled in said casing, a luminous indicator rigidly mounted upon the upper end of said supporting member and adapted for indicating right and left turning movements of the vehicle, a segment carried by said supporting member, mutilated gears co-operatively associated with said segment, springs coacting with said gears to normally urge the indicator to a predetermined neutral position, and actuating gears and a lever operatively connected to said supporting member to cause the actuation of said indicator and a selected one of said mutilated gears against the urge of its spring.

5. In a signal of the class described, an indicator mounted for turning movement throughout an arc of 180 degrees, neutralizing means associated with said indicator to cause it to assume a normal predetermined neutral position, and means for causing the functioning of said indicator to swing it from said neutral position to a right or left indicating position.

6. In a signal of the class described, a luminous indicator in the form of an arrow mounted for turning movement through an arc of 180 degrees, means for retaining said indicator in a predetermined neutral position, and means for turning said indicator in opposite directions from its neutral position to indicate turning movements of motor vehicles.

7. In a signal of the class described, an indicator mounted for turning movement through an arc of 180 degrees, neutralizing means associated with said indicator to cause it to assume a normal predetermined neutral position, means for causing the functioning of said indicator to swing it from said neutral position to the right or left therefrom to a selected indicating position, and brake-means coacting therewith to prevent the too sudden return of the indicator to neutral position.

In testimony whereof I hereunto affix my signature.

KENDA FUTAMATA.